Dec. 6, 1932.  J. T. CLARK  1,889,799
AUTOMOBILE TIRE
Filed Sept. 13, 1930
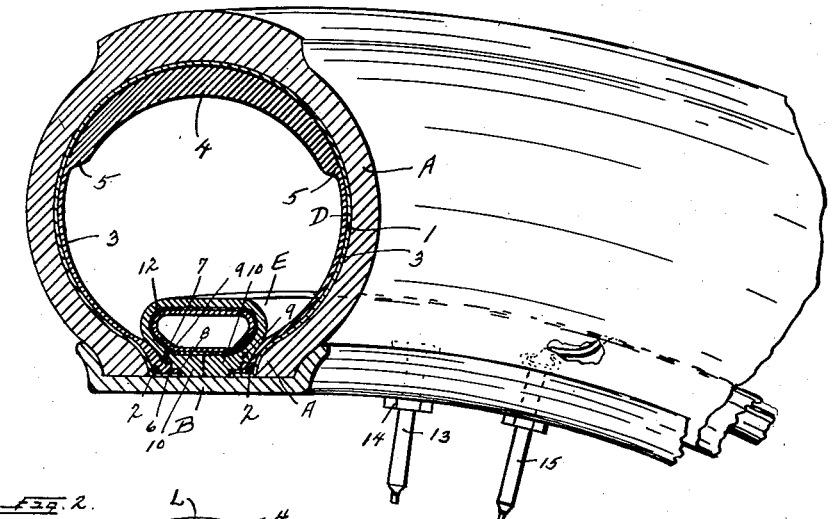
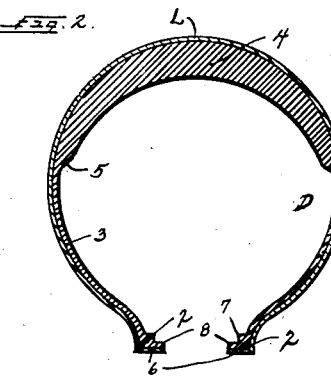
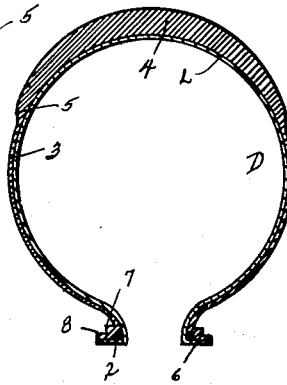
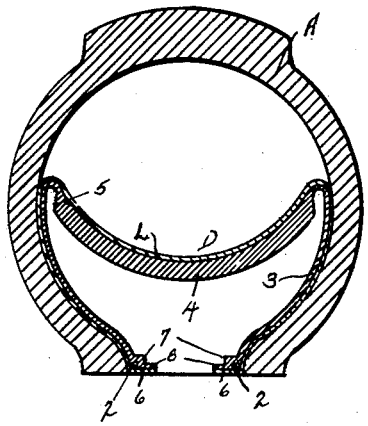
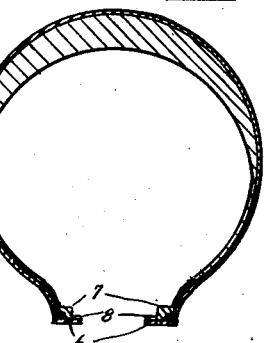
Inventor
John T. Clark.
By
R. M. Thomas
Attorney Patented Dec. 6, 1932

1,889,799

UNITED STATES PATENT OFFICE

JOHN T. CLARK, OF SALT LAKE CITY, UTAH

AUTOMOBILE TIRE

Application filed September 13, 1930. Serial No. 481,619.

My invention relates to tires for motor vehicles and has for its object to provide a new and efficient automobile tire which will eliminate all road hazards such as rim cuts, punctures, inner tube friction and the usual tire troubles.

A further object is to provide a tire which will be constructed with a puncture seal liner therein, to seal all holes made by nails, tacks, glass or other sharp objects, and which will be provided with an inner casing to seal the lower edges of the outer casing, so that air may be blown into the outer casing to any desired pressure, without the use of an inner tube.

A still further object is to provide an inner liner for automobile tire casings which will be made with a thickened portion thereon, and which when inserted into the casing will be reversed and forced into the casing by pressure, thereby making a tight seal between the liner and the casing and which liner will be formed of rubber lined with fabric and when inverted the angle of the rubber will change until the thick portion thereof will be pressed much more tightly together than before reversed and inserted in the casing, so that should a nail be driven through the casing the compression force of the rubber will close the hole immediately when the nail is withdrawn.

This liner is to be used in conjunction with an inner casing for sealing the lower edges of the outer casing together so that no air may escape from the outer casing, and the inner casing will be provided with an inner tube to inflate said casing and create the necessary pressure to seal the beading of the outer casing thereto when placed within the rim.

These objects I accomplish with the device illustrated in the accompanying drawing in which similar numerals and letters of reference indicate like parts throughout the several views and as described in the specification forming a part of this application and pointed out in the appended claims.

In the drawing in which I have shown the best and most preferred manner of building my invention Figure 1 is a radial section of a tire, parts shown in perspective, and parts cut away, showing the complete tire as assembled for running after inflation of both inner and outer casings. Figure 2 is a section of the liner as it will appear when installed in a tire. Figure 3 is a section of the liner as made before installation. Figure 4 is a section of a modified form of liner in which some nappy material such as wool is filled with a soft gum to produce the seal when a nail is run into the tire and then withdrawn. Figure 5 is a section of a tire with the liner in place therein preparatory to securing the liner therein, the liner being shown half reversed ready to have the thickened portion forced up into the tire by mechanical means or by air pressure, using an inner tube thereunder, or the liner may be sealed in the tire by placing the inner casing in the tire and inflating the inner casing to sufficient pressure to seal the outer casing and then inflate the outer casing as for running. This air pressure will force the liner into place in the outer casing.

In the drawing I have shown the outer casing as A, the rim as B, and into the outer casing I place a liner D. The liner D is made of a sheet of fabric L, bent at an angle at the ends and having a wire beading 2 secured therein. The fabric is then formed integral with a sheet of rubber 3, which sheet of rubber is made with a thickened tread-like portion 4 medially between the ends thereof, similar to the tread of an outer casing. The thickened tread-like portion has the ends thereof curved out to the rest of the liner, forming a shoulder 5 thereon. The ends of the rubber side walls are extended at right angles to form flaps 6, with an annular angled ridge 7 formed in the angle of the rubber around the beading 2 and the end of the flaps 6 forms an angled edge 8 thereon. The ridge 7 and edge 8 are to aid in sealing the air in the liner by contacting with the rubber portions of an inner casing E.

The liner D is made as shown in Figure 3 and is then turned and placed within the casing as shown in Figure 5, first cleaning off the inner surface of the casing and the abutting of the liner and the casing may be coated with semi-cured rubber or with rubber cement before inserting the liner therein. When the liner is inserted therein it takes the form shown in Figure 5 and the liner may then be pressed into the tire by mechanical means or by placing an inner tube therein and inflating the tube, with the tire mounted on a rim. This will force the liner into place as shown in Figure 1. The tire is then ready for the sealing by placing a smaller inner casing E between the rim engaging portions of the outer casing, and the lower outer walls of the inner liner, and the inner casing will rest partially on the flaps 6 and the balance on the inner surface of the rim B. The abutting surface of the inner liner and the surface of the liner which come into contact therewith are sealed together by the annular ridge 7 and edge 8. The inner casing is made with the side walls provided with a wire beading 9 therein and with the edges 10 thickened and an inner tube 12 is placed in the inner casing by which it is inflated with a valve stem 13 extended down through the edges 10 and the rim B where it is secured by a nut 14. Another valve stem 15 is placed through the rim B and extended up into the inner casing to where a tube is passed through said casing into open connection with the interior space within the liner and within the outer casing. This tube allows for inflation of the outer casing. The inner casing is placed within the liner edges of the outer casing with the inner tube therein and the tire is placed on the rim with both tubes extending through the rim. Air is introduced into the inner tube inflating the inner casing and forcing the edges thereof outwardly sealing them to the edges of the liner by the pressure forcing the rubber of the inner casing against the ridge 7 and edge 8 of the liner D. When sufficient air pressure has been placed in the inner casing to seal the space within the inner liner, air is then forced through the stem 15 and the tube 16 into the space above the inner casing within the liner and outer casing to the desired pressure for running. The pressure inserted into the liner may be much less than formerly used in outer casings for the inner casing will prevent the outer casing from being ruined by stones or other obstacles or rim cuts and act as an escape valve to avoid blow-outs.

Having thus described my invention I desire to secure by Letters Patent and claim:—

1. In a liner for tires the combination of side walls formed to a thickened tread-like portion; inwardly extending flanges formed on the edges of the side walls, annular ridges formed on the surface of the flanges and wire beadings carried in the walls adjacent said ridges.

2. In a liner for tires the combination of an annular fabric liner having a thickened tread-like portion formed on the outer side thereof and having the edges formed into step-like flanges, said liner to be reversed into a tire with the tread-like portion turned and compressed inwardly and the step-like flanges directed towards each other.

3. In a liner for tires the combination of side walls formed to a thickened tread-like portion; inwardly extended step-like flanges formed on the edges of the side walls; and wire beading carried in the walls adjacent said flanges.

4. In a liner for tires the combination of side walls formed to a thickened tread-like portion on the outer surface thereof; outwardly extending step-like flanges formed on the edges of the side walls; said liner to be reversed when placed within a tire with the tread-like portion within and with the step-like flanges extending inwardly substantially as described.

In testimony whereof I have affixed my signature.

JOHN T. CLARK.